United States Patent
Cho et al.

(10) Patent No.: US 11,650,476 B2
(45) Date of Patent: *May 16, 2023

(54) APPARATUS, CIRCUITS AND METHODS FOR REDUCING MISMATCH IN AN ELECTRO-OPTIC MODULATOR

(71) Applicant: Taiwan Semiconductor Manufacturing Co., Ltd., Hsinchu (TW)

(72) Inventors: Lan-Chou Cho, Hsinchu (TW); Chewn-Pu Jou, Hsinchu (TW); Min-Hsiang Hsu, Hsin-Chu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/503,095

(22) Filed: Oct. 15, 2021

(65) Prior Publication Data

US 2022/0035223 A1 Feb. 3, 2022

Related U.S. Application Data

(63) Continuation of application No. 16/804,522, filed on Feb. 28, 2020, now Pat. No. 11,156,894.

(51) Int. Cl.
G02F 1/225 (2006.01)
G02F 1/21 (2006.01)

(52) U.S. Cl.
CPC ............ *G02F 1/2255* (2013.01); *G02F 1/212* (2021.01)

(58) Field of Classification Search
CPC ............................... G02F 1/2255; G02F 1/212
See application file for complete search history.

(56) References Cited

U.S. PATENT DOCUMENTS

| | | | |
|---|---|---|---|
| 11,156,894 B2 * | 10/2021 | Cho | G02F 1/2255 |
| 2018/0039151 A1 | 2/2018 | Doerr | |
| 2019/0162984 A1 | 5/2019 | Sugiyama | |
| 2019/0271896 A1 | 9/2019 | Sugiyama | |
| 2020/0272021 A1 | 8/2020 | Hara | |

\* cited by examiner

*Primary Examiner* — Sung H Pak
(74) *Attorney, Agent, or Firm* — Duane Morris LLP

(57) ABSTRACT

Apparatus, circuits and methods for reducing mismatch in an electro-optic modulator are described herein. In some embodiments, a described optical includes: a splitter configured for splitting an input optical signal into a first optical signal and a second optical signal; a phase shifter coupled to the splitter; and a combiner coupled to the phase shifter. The phase shifter includes: a first waveguide arm configured for controlling a first phase of the first optical signal to generate a first phase-controlled optical signal, and a second waveguide arm configured for controlling a second phase of the second optical signal to generate a second phase-controlled optical signal. Each of the first and second waveguide arms includes: a plurality of straight segments and a plurality of curved segments. The combiner is configured for combining the first and second phase-controlled optical signals to generate an output optical signal.

20 Claims, 10 Drawing Sheets

APPARATUS, CIRCUITS AND METHODS FOR REDUCING MISMATCH IN AN ELECTRO-OPTIC MODULATOR

CROSS-REFERENCE OF RELATED APPLICATION

This is a Continuation Application of U.S. patent application Ser. No. 16/804,522, filed Feb. 28, 2020, the contents of which is incorporated by reference herein in its entirety.

BACKGROUND

An electro-optic modulator (EOM) is an optical device in which a signal-controlled element exhibiting an electro-optic effect is used to modulate a beam of light. A Mach-Zehnder modulator (MZM) is a phase modulating EOM used as an amplitude modulator by using a Mach-Zehnder interferometer (MZI).

Conventionally, an MZM includes a multi-mode interference (MMI) splitter, an MZI, a phase shifter, an MMI combiner. The MZM modulates the phase of an optical signal based on radio frequency (RF) electrical signals, e.g. based on controlled voltage signals. The MZI is implemented by two unbalanced waveguides that occupy additional area other than where the phase shifter is. The phase shifter is implemented by two arms of doped waveguides. The length of each doped waveguide has to be long enough to generate extinction ratio (ER) of the modulator. But these long doped waveguides will induce terrible process mismatch between the two waveguide arms, and induce phase mismatch between two terminals, MMI splitter and MMI combiner, on the two ends of the phase shifter. The RF electrical signal and the optical signal may have different phase velocity, which further induces phase mismatch. As such, the existing electro-optic modulators are not entirely satisfactory to overcome the above mentioned drawbacks.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAIL DESCRIPTION

Figure 1:
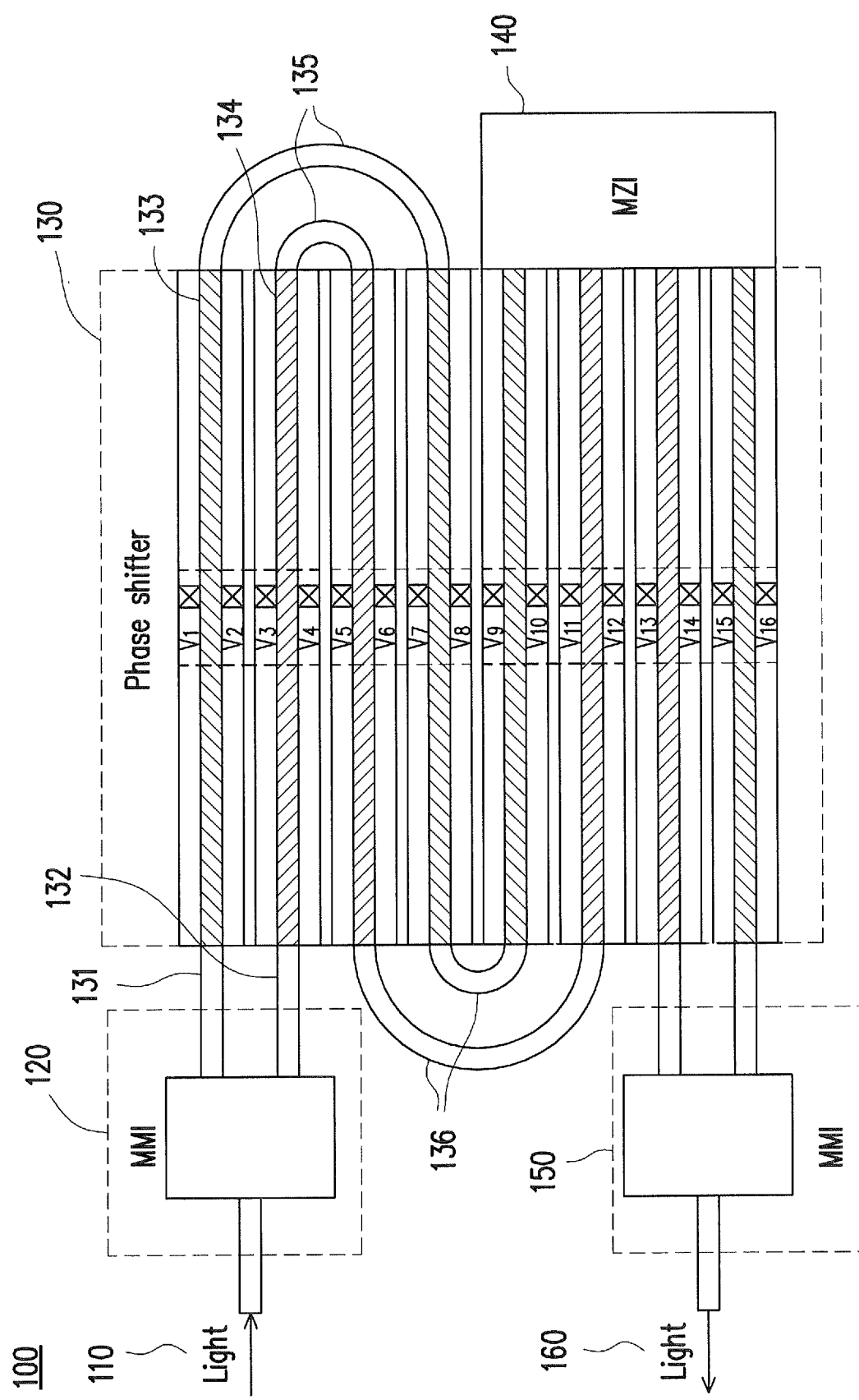
FIG. 1 illustrates a schematic diagram of an exemplary Mach-Zehnder modulator (MZM), in accordance with some embodiments of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference will now be made in detail to the present embodiments of the disclosure, examples of which are illustrated in the accompanying drawings. Wherever possible, the same reference numbers are used in the drawings and the description to refer to the same or like parts.

The present disclosure provides devices, circuits and methods for reducing or removing mismatches in an electro-optic modulator (EOM), e.g. a Mach-Zehnder modulator (MZM) that includes multi-mode interference (MMI), Mach-Zehnder interferometer (MZI), and a phase shifter. In one embodiment, the phase shifter in a disclosed MZM includes two arms of doped waveguides, where each arm includes both straight segments and curved segments. This kind of phase shifter structure is more compact than a conventional design to save area, and can improve the process mismatch of phase shifters and overcome the phase mismatch between the optical path and the electrical path. In addition, the MZI may be merged into the phase shifter to further save the area. The two arms are symmetric to ensure good temperature coefficient.

The MZM can control phase of light by changing a controlled voltage ($V_c$) of one arm, and using a reference voltage ($V_r$) to control a reference phase of light in the other arm. In one embodiment, at least one electrical phase calibrator (EPC) is used to generate electrical signals, e.g. based on the controlled voltage ($V_c$), the reference voltage ($V_r$), and the ground voltage (GND), for controlling the optical signal phase in the phase shifter, which improves or reduces phase mismatch between the electrical signal and the optical signal. While each arm of the phase shifter includes a plurality of segments, different segments may be controlled by different electrical signals generated by different EPCs, which improves the bandwidth of the MZM.

FIG. 1 illustrates a schematic diagram of an exemplary Mach-Zehnder modulator (MZM) 100, in accordance with some embodiments of the present disclosure. As shown in FIG. 1, the exemplary MZM 100 includes a multi-mode interference (MMI) splitter 120, a phase shifter 130, and a MMI combiner 150. The MMI splitter 120 may be configured for splitting an input optical signal 110 into two optical signals: a first optical signal and a second optical signal. In one embodiment, each of the MMI splitter 120, the phase shifter 130, and the MMI combiner 150 may be formed based on silicon-on-insulator (SOI) technology, i.e. including a silicon-insulator-silicon structure, where the insulator may be a buried oxide layer.

The phase shifter 130 is directly coupled to the MMI splitter 120 and includes two waveguide arms, i.e. a first waveguide arm 131 and a second waveguide arm 132. In one embodiment, the first waveguide arm 131 is configured for receiving the first optical signal from the MMI splitter 120 and for controlling a first phase of the first optical signal to generate a first phase-controlled optical signal. The second waveguide arm 132 is configured for receiving the second optical signal from the MMI splitter 120 and for controlling a second phase of the second optical signal to generate a second phase-controlled optical signal. In another embodiment, the first waveguide arm 131 may receive and control phase of the second optical signal; while the second waveguide arm 132 may receive and control phase of the first optical signal. According to various embodiments, the first waveguide arm 131 and the second waveguide arm 132 may be designed to operate on O band, i.e. with an operating wavelength range from 1260 nm to 1360 nm; or operate on C band, i.e. with an operating wavelength range from 1530 nm to 1565 nm.

The MMI combiner 150 is directly coupled to the phase shifter 130 and is configured for combining the first and second phase-controlled optical signals to generate an output optical signal 160. The output optical signal 160 is a modulated light whose phase is controlled by the phase shifter 130.

As shown in FIG. 1, each of the first and second waveguide arms 131, 132 includes: a plurality of straight segments 133, 134, and a plurality of curved segments 135, 136. According to various embodiments, each straight segment 133, 134 may have a length between 0.1 millimeter to 100 millimeters; and each curved segment 135, 136 may have a length between 1 micrometer to 100 micrometers. In one embodiment, the plurality of straight segments are parallel to each other. In one embodiment, the plurality of straight segments have a same length. Any two adjacent straight segments among the plurality of straight segments in a same waveguide arm are connected via one of the plurality of curved segments. As such, for each of the first and second waveguide arms, the plurality of straight segments and the plurality of curved segments are alternatively arranged. A curved segment here means a segment including at least one curved portion or at least one bent portion, i.e. the curved segment is not entirely straight.

In this manner, a long straight waveguide arm is divided into multiple short straight arm segments and multiple curved or bent arm segments, which enables an easy control of process mismatch between the two waveguide arms 131, 132 of the phase shifter 130, and reduces a phase mismatch between two terminals (e.g. the MMI splitter 120 and the MMI combiner 150) coupled to the two ends of the phase shifter 130.

In the example shown in FIG. 1, each of the first and second waveguide arms includes four straight segments and three curved segments connecting the four straight segments. The phase shifter 130 further includes a Mach-Zehnder interferometer (MZI) 140. The MZI 140 in this example is formed of two curved segments: a first curved segment in the plurality of curved segments of the first waveguide arm 131; and a second curved segment in the plurality of curved segments of the second waveguide arm 132. The two curved segments form two unbalanced waveguides of the MZI 140, which is thus integrated into the phase shifter 130 to save circuit area.

In the example shown in FIG. 1, except the portion in the MZI 140, the first waveguide arm 131 and the second waveguide arm 132 have a same length. That is, a total length difference between the first waveguide arm 131 and the second waveguide arm 132 is equal to a length difference between the two curved segments in the MZI 140. In one embodiment, the second curved segment is longer than the first curved segment by a length difference predetermined based on a phase shift requirement associated with the MZI 140. A detailed description will be provided later regarding the structure inside the MZI 140.

The MZM 100 modulates the phase of the optical signal 110 based on radio frequency (RF) electrical signals, e.g. based on controlled voltage signals. Each of the two waveguide arms 131, 132 receives voltage signals for controlling the light phase. For example, the first waveguide arm 131 is configured for controlling the first phase of the first optical signal based on a first set of electrical signals V1, V7, V9, V15, and a second set of electrical signals V2, V8, V10, V16. The second waveguide arm 132 is configured for controlling the second phase of the second optical signal based on a third set of electrical signals V3, V5, V11, V13, and a fourth set of electrical signals V4, V6, V12, V14.

In the example shown in FIG. 1, each straight segment is configured for phase controlling based on two electrical signals. For the first waveguide arm 131, each of the plurality of straight segments is configured for phase controlling based on one of the first set of electrical signals V1, V7, V9, V15 and one of the second set of electrical signals V2, V8, V10, V16. For the second waveguide arm 132, each of the plurality of straight segments is configured for phase controlling based on one of the third set of electrical signals V3, V5, V11, V13 and one of the fourth set of electrical signals V4, V6, V12, V14. For example, the first straight segment of the first waveguide arm 131 receives and uses two electrical signals V1 and V2 to control phase of the first optical signal.

Controlling a phase of a light here means either shifting the phase of the light or keeping the phase of the light as a reference. Each arm of the phase shifter 130 in FIG. 1 includes four straight segments receiving different electrical signals, e.g. different voltage signals, for phase controlling. That is, four rounds of voltage signals are applied to the phase shifter 130 for phase controlling in FIG. 1. Compared to applying voltage signals for merely one round, applying voltage signals for four rounds as shown in FIG. 1 can approximately improve the RF bandwidth by four times, since the loading of each applied voltage signal is reduced to one fourth.

The structure of the MZM 100 in FIG. 1 is more compact than a phase shifter design with a long straight waveguide arm and extra area for MZI. The two arms 131, 132 are doped waveguides and symmetric to each other, except the MZI 140 that is designed to be asymmetric for phase shifting. For example, the left curved portion 136 is symmetric to the right curved portion 135, and the straight portions have a same length to each other. This ensures a good temperature coefficient of the MZM 100. In one embodiment, the arm 131 includes n-type doped silicon and the arm 132 includes p-type doped silicon. In another embodiment, the arm 132 includes n-type doped silicon and the arm 131 includes p-type doped silicon.

Figure 2:
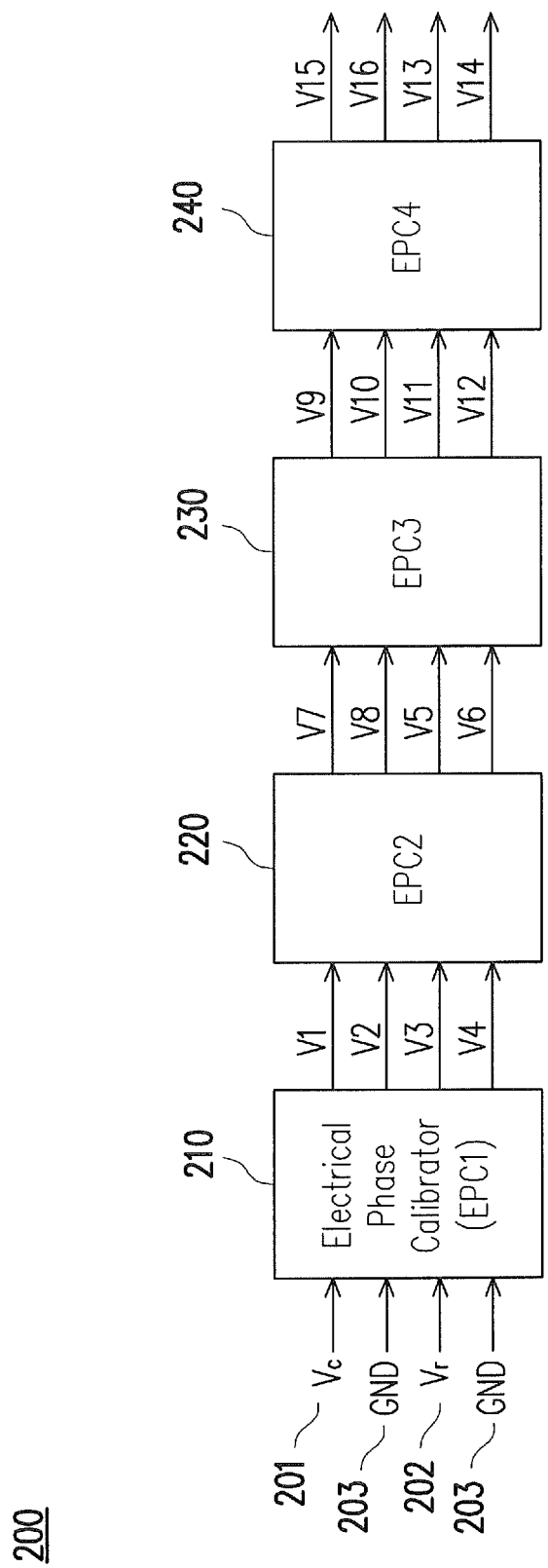
FIG. 2 illustrates a schematic diagram of a circuit for generating controlled electrical signals for light phase modulation, in accordance with some embodiments of the present disclosure.

FIG. 2 illustrates a schematic diagram of a circuit 200 for generating controlled electrical signals for light phase modulation, in accordance with some embodiments of the present disclosure. As shown in FIG. 2, the circuit 200 includes a plurality of electrical phase calibrators (EPCs), i.e. EPC1 210, EPC2 220, EPC3 230, EPC4 240, configured for generating a plurality of sets of electrical signals. Each of the plurality of sets may include electrical signals with different phase delays.

As discussed above, each waveguide arm of the phase shifter may control the light phase based on electrical signals applied for multiple rounds. In the example shown in FIG. 1 and FIG. 2, there are four rounds of electrical signals to apply. For example, for each of the first and second waveguide arms 131, 132 in FIG. 1, each straight segment corresponds to one of the plurality of EPCs 210, 220, 230, 240. That is, a quantity of the plurality of straight segments in each arm is equal to a quantity of the plurality of EPCs in the circuit 200, where the quantity is 4 in FIG. 1 and FIG. 2.

As shown in FIG. 2, EPC1 210 generates the first round of electrical signals V1, V2, V3, V4, based on a controlled voltage ($V_c$) 201, a reference voltage ($V_r$) 202, and a ground voltage (GND) 203. The EPC2 220 generates the second round of electrical signals V7, V8, V5, V6, respectively, based on the first round of electrical signals V1, V2, V3, V4. The EPC3 230 generates the third round of electrical signals V9, V10, V11, V12, based on the second round of electrical signals V7, V8, V5, V6, respectively. The EPC4 240 generates the fourth round of electrical signals V15, V16, V13, V14, based on the third round of electrical signals V9, V10, V11, V12, respectively.

As such, the MZM 100 can control phase of light by changing the controlled voltage ($V_c$) 201 and its calibrated versions (V1, V7, V9, V15) to apply to one waveguide arm for light phase shifting; and by using the reference voltage ($V_r$) 202 and its calibrated versions (V3, V5, V11, V13) to control a reference phase of light in the other waveguide arm. This reduces phase mismatch between the electrical signal and the optical signal.

Figure 3:
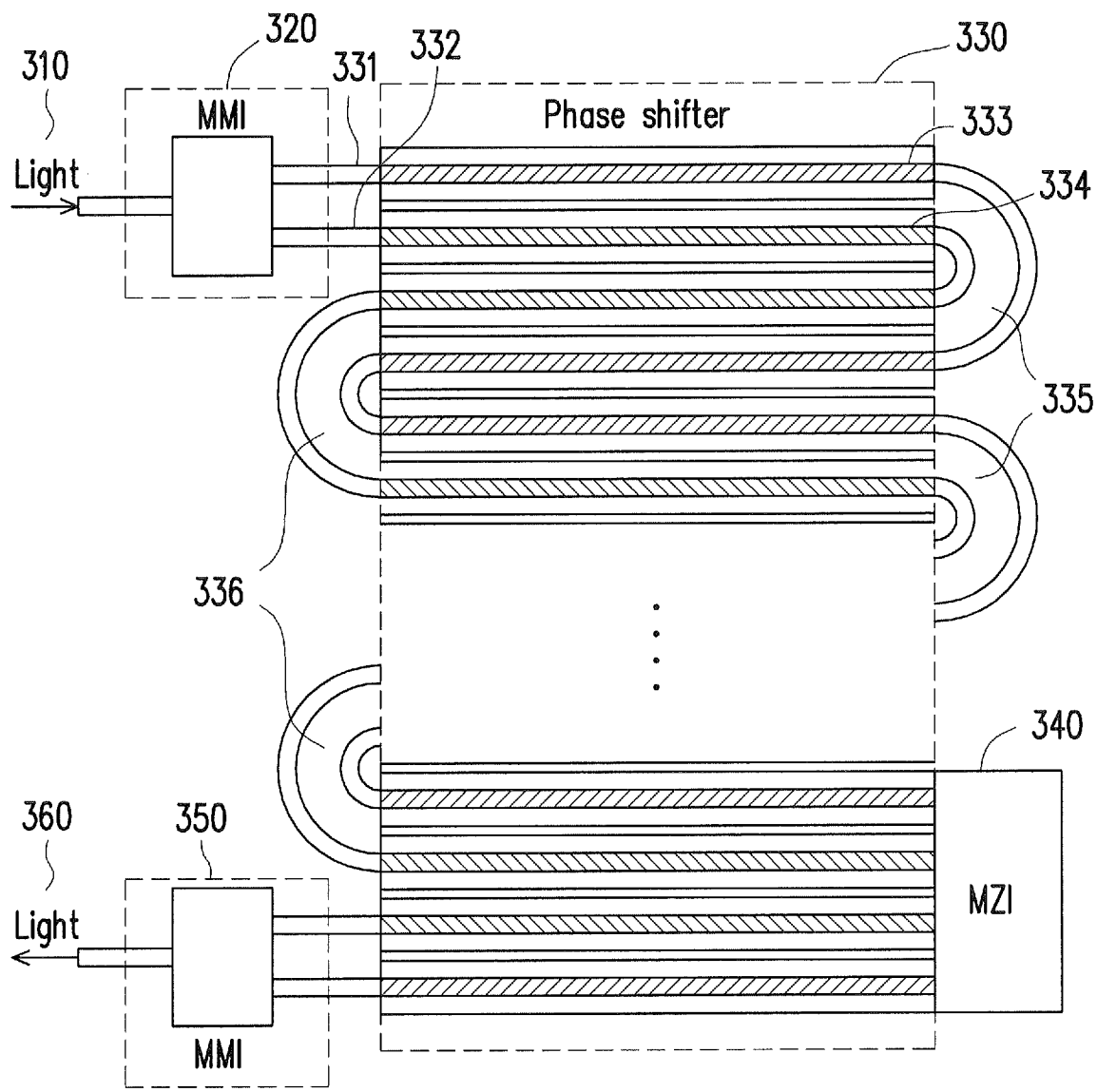
FIG. 3 illustrates a schematic diagram of another exemplary MZM, in accordance with some embodiments of the present disclosure.

FIG. 3 illustrates a schematic diagram of another exemplary MZM 300, in accordance with some embodiments of the present disclosure. As shown in FIG. 3, the exemplary MZM 300 includes a MMI splitter 320, a phase shifter 330, and a MMI combiner 350. The MMI splitter 320 splits an input optical signal 310 into two optical signals: a first optical signal and a second optical signal. The phase shifter 330 is directly coupled to the MMI splitter 320 and includes two waveguide arms, i.e. a first waveguide arm 331 and a second waveguide arm 332. The MMI combiner 350 is directly coupled to the phase shifter 330 and is configured for combining the first and second phase-controlled optical signals to generate an output optical signal 360. The MZM 300 modulates the phase of the optical signal based on radio frequency (RF) electrical signals.

The phase shifter 330 is similar to the phase shifter 130 in FIG. 1, except that each of the first and second waveguide arms 331, 332 includes: more than four straight segments 333, 334, and at least four curved segments 335, 336. In this manner, a long straight waveguide arm is divided into N segmented doped waveguides, i.e. multiple short straight arm segments and multiple curved or bent arm segments, which enables an easy control of process mismatch between the two waveguide arms 331, 332 of the phase shifter 330, and reduces a phase mismatch between two terminals (e.g. the MMI splitter 320 and the MMI combiner 350) coupled to the two ends of the phase shifter 330. In the example shown in FIG. 3, a quantity of the left curved portions 336 is equal to a quantity of the right curved portions 335, to ensure the two arms 331, 332 are symmetric to each other.

Similar to the phase shifter 130 in FIG. 1, the phase shifter 330 further includes a Mach-Zehnder interferometer (MZI) 340 formed of two curved segments. The two curved segments form two unbalanced waveguides of the MZI 340, which is integrated into the phase shifter 330 to save circuit area. Except the portion in the MZI 340, the first waveguide arm 331 and the second waveguide arm 332 have a same length. That is, a total length difference between the first waveguide arm 331 and the second waveguide arm 332 is equal to a length difference between the two curved segments in the MZI 340. A detailed description will be provided later regarding the structure inside the MZI 340.

Figure 4:
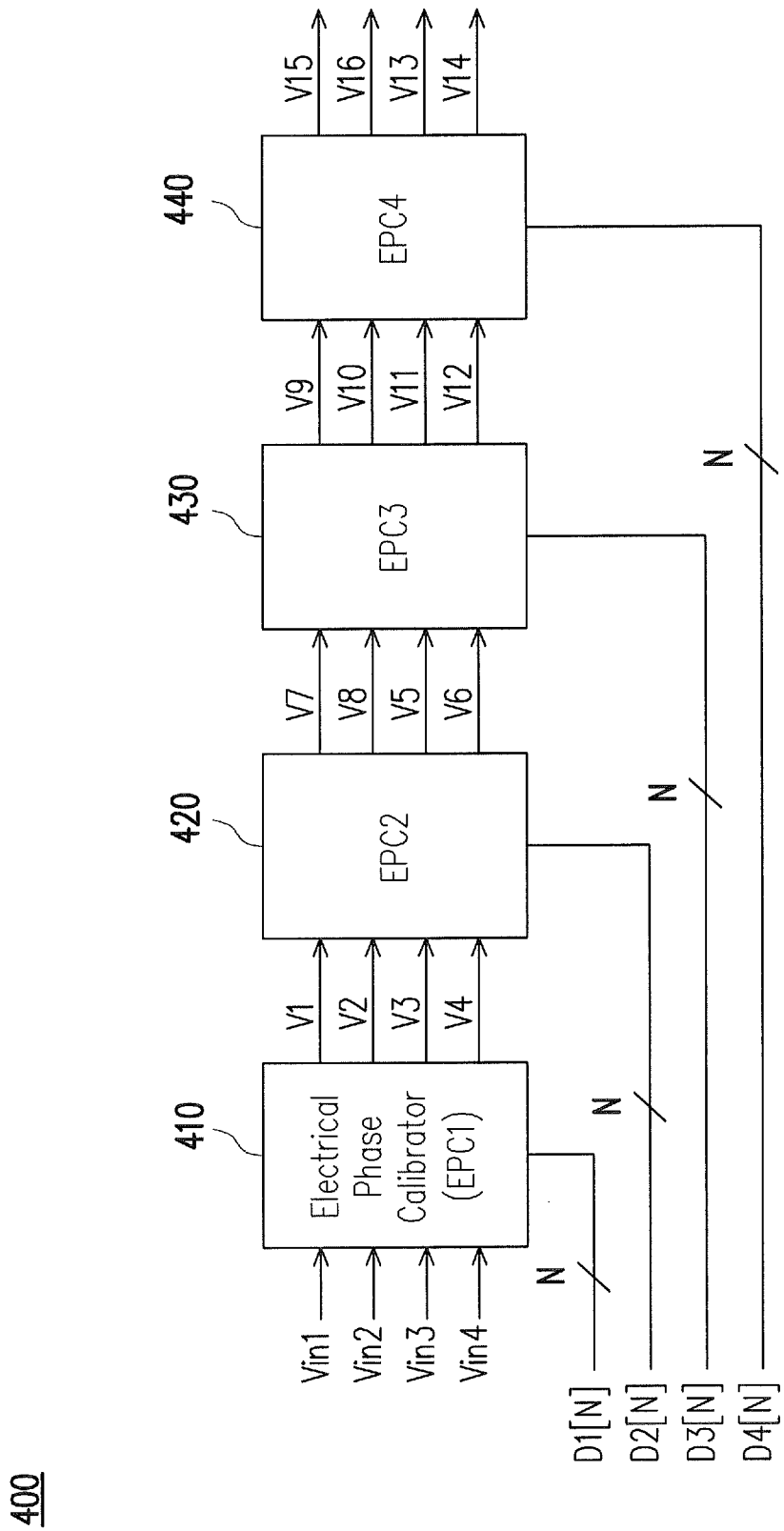
FIG. 4 illustrates a schematic diagram of another circuit for generating controlled electrical signals for light phase modulation, in accordance with some embodiments of the present disclosure.

FIG. 4 illustrates a schematic diagram of another circuit 400 for generating controlled electrical signals for light phase modulation, in accordance with some embodiments of the present disclosure. As shown in FIG. 4, the circuit 400 includes a plurality of electrical phase calibrators (EPCs), i.e. EPC1 410, EPC2 420, EPC3 430, EPC4 440, configured for generating a plurality of sets of electrical signals. Each of the plurality of sets may include electrical signals with different phase delays.

Similar to the circuit 200 in FIG. 2, the circuit 400 generates four rounds of electrical signals with different phase delays. To be specific, EPC1 410 generates the first round of electrical signals V1, V2, V3, V4, based on four input signals Vin1, Vin2, Vin3, Vin4, respectively, using N digital bits D1[N]. The EPC2 420 generates the second round of electrical signals V7, V8, V5, V6, respectively, based on the first round of electrical signals V1, V2, V3, V4, using N digital bits D2[N]. The EPC3 430 generates the third round of electrical signals V9, V10, V11, V12, based on the second round of electrical signals V7, V8, V5, V6, respectively, using N digital bits D3[N]. The EPC4 440 generates the fourth round of electrical signals V15, V16, V13, V14, based on the third round of electrical signals V9, V10, V11, V12, respectively, using N digital bits D4[N].

Each waveguide arm of a phase shifter may control the light phase based on electrical signals applied for multiple rounds. For example, a waveguide arm can control phase of light by applying the calibrated voltage signals (V1, V7, V9, V15) at different segments of the arm for light phase shifting or controlling. The EPCs can control and calibrate the phases of output electrical signals, to match the phases of the output optical signal. Using EPCs reduces phase mismatch between the electrical signal and the optical signal after calibration.

Figure 5:
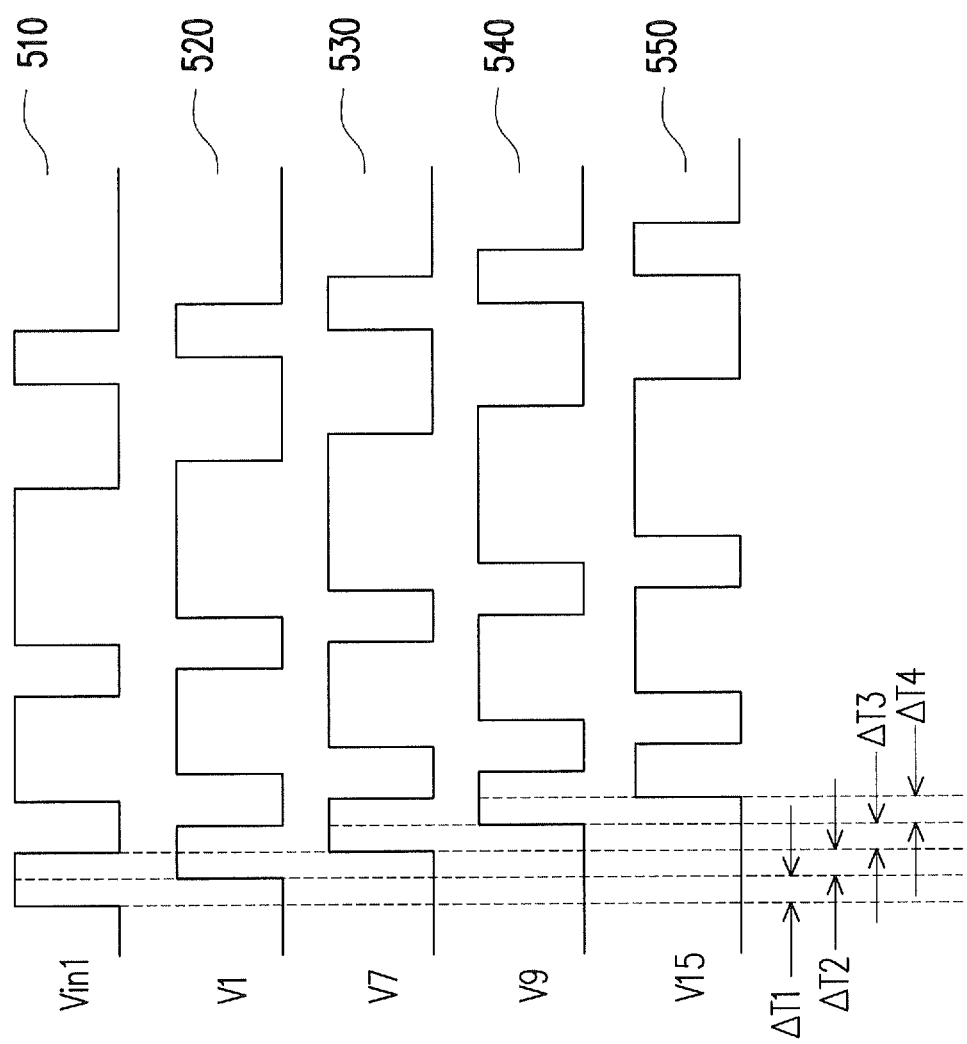
FIG. 5 illustrates exemplary voltage waveforms for the circuit shown in FIG. 4, in accordance with some embodiments of the present disclosure.

FIG. 5 illustrates exemplary voltage waveforms for the circuit 400 shown in FIG. 4, in accordance with some embodiments of the present disclosure. As shown in FIG. 5, the V1 waveform 520 is same as the Vin1 waveform 510, except having a phase delay of ΔT1 compared to the Vin1 waveform 510. The phase delay of ΔTI is controlled by the N digital bits D1[N] shown in FIG. 4. The V7 waveform 530 is same as the V1 waveform 520, except having a phase delay of ΔT2 compared to the V1 waveform 520. The phase delay of ΔT2 is controlled by the N digital bits D2[N] shown in FIG. 4. Similarly, the V9 waveform 540 is same as the V7 waveform 530, except having a phase delay of ΔT3 controlled by the N digital bits D3[N] in FIG. 4, compared to the V7 waveform 530. The V15 waveform 550 is same as the V9 waveform 540, except having a phase delay of ΔT4 controlled by the N digital bits D4[N] in FIG. 4, compared to the V9 waveform 540.

Figure 6:
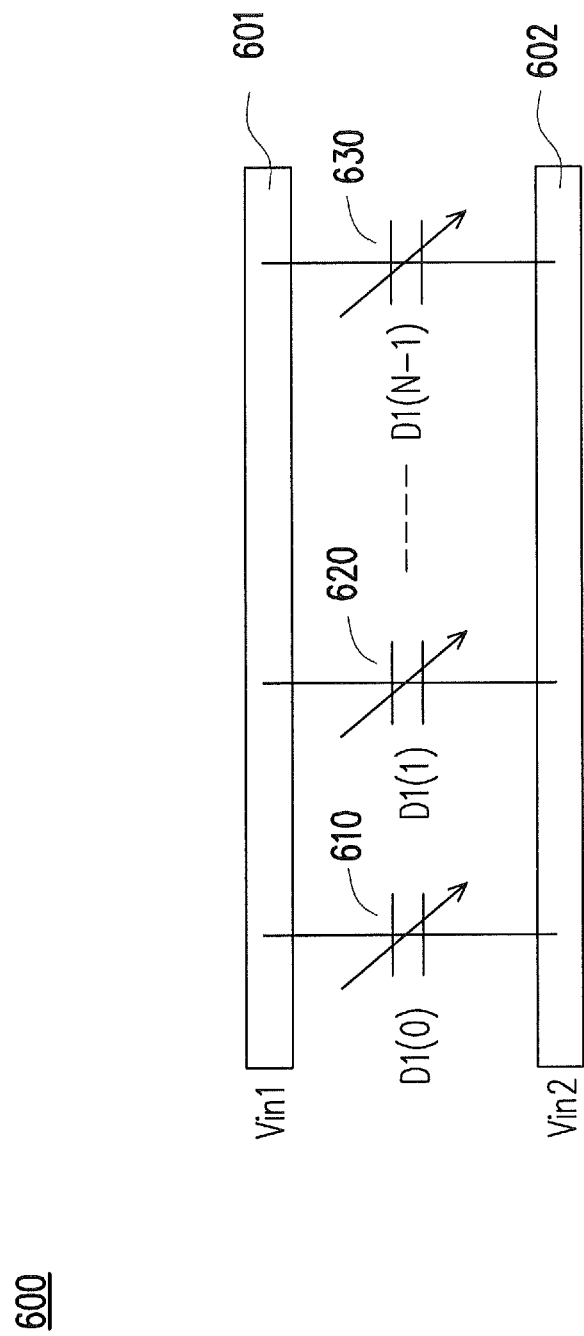
FIG. 6 illustrates a diagram of a partial circuit of an electrical phase calibrator in the circuit shown in FIG. 4, in accordance with some embodiments of the present disclosure.

FIG. 6 illustrates a diagram of a partial circuit 600 of an electrical phase calibrator, e.g. the EPC1 410 in the circuit shown in FIG. 4, in accordance with some embodiments of the present disclosure. As shown in FIG. 6, the EPC circuit 600 includes transmission lines 601, 602, with an array of switched capacitors 610, 620, 630. Each of the switched capacitors 610, 620, 630 is controlled by a corresponding one of the N digital bits D1[N]. For example, the switched capacitor 610 is controlled by the digital bit D1(0); the switched capacitor 620 is controlled by the digital bit D1(1); and the switched capacitor 630 is controlled by the digital bit D1(N−1). In one embodiment, the EPC1 410 in FIG. 4 includes four transmission lines and two switched capacitor arrays controlled by digital bits. The first switched capacitor array is the array of switched capacitors 610, 620, 630 between transmission lines Vin1 and Vin2 as shown in FIG. 6. The second switched capacitor array would be between transmission lines Vin3 and Vin4 in FIG. 4, and have similar structures to the array of switched capacitors 610, 620, 630 in the circuit 600, and are omitted here for simplicity. Each of the other EPCs in FIG. 4 may also have a similar structure to that of the EPC1 410.

Figure 7:
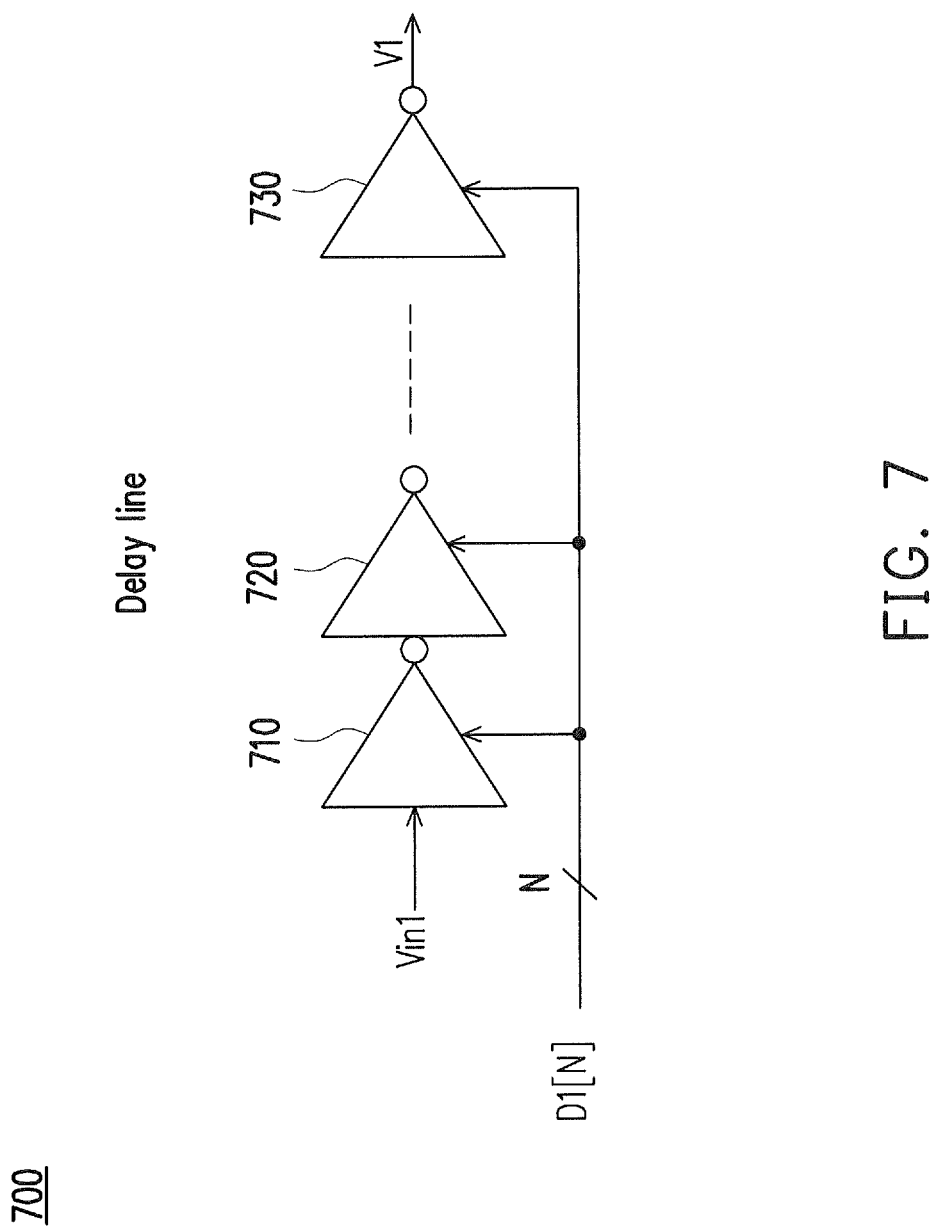
FIG. 7 illustrates another diagram of a partial circuit of an electrical phase calibrator in the circuit shown in FIG. 4, in accordance with some embodiments of the present disclosure.

FIG. 7 illustrates another diagram of a partial circuit 700 of an electrical phase calibrator, e.g. the EPC1 410 in the circuit shown in FIG. 4, in accordance with some embodiments of the present disclosure. As shown in FIG. 7, the EPC circuit 700 includes a delay line comprising an array of serially connected delay cells 710, 720, 730. Each of the delay cells 710, 720, 730 may include an invertor or an amplifier. Each of the delay cells 710, 720, 730 is controlled by a corresponding one of the N digital bits D1[N]. For example, the delay cell 710 is controlled by the digital bit D1(0); the delay cell 720 is controlled by the digital bit D1(1); and the delay cell 730 is controlled by the digital bit D1(N−1). In one embodiment, the EPC1 410 in FIG. 4 includes four delay lines formed of serially connected delay cells controlled by digital bits, where each delay line including delay cells have similar structures to the circuit 700, and are omitted here for simplicity. Each of the other EPCs in FIG. 4 may also have a similar structure to that of the EPC1 410. In another embodiment, different EPCs in FIG. 4 may have different structures, e.g. one EPC having a structure shown in FIG. 6 and another EPC having a structure shown in FIG. 7.

Figure 8C:
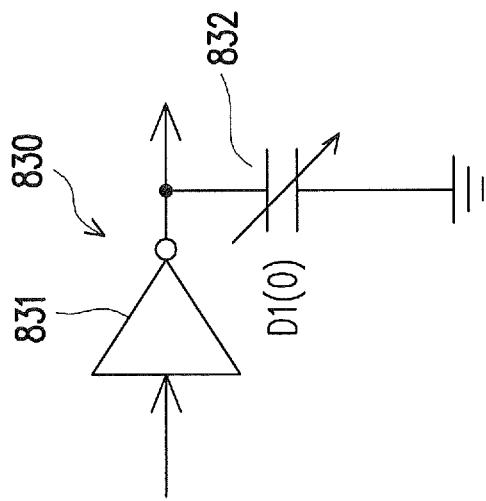
FIGS. 8A-8C illustrate exemplary delay cells in the partial circuit shown in FIG. 7, in accordance with some embodiments of the present disclosure.
Figure 8B:
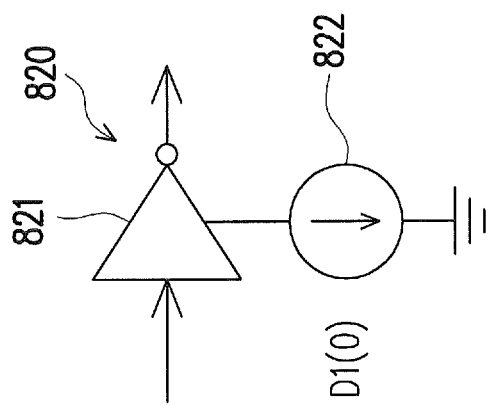
Figure 8A:
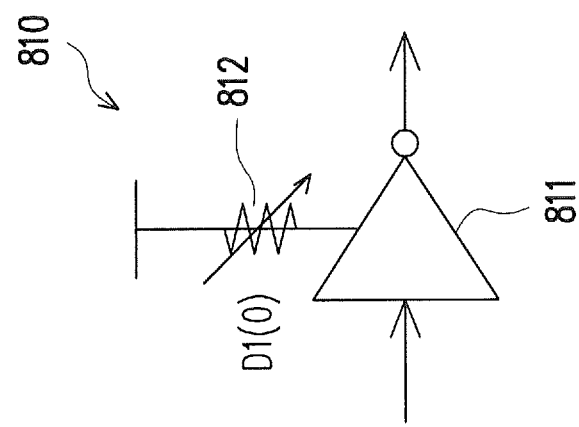

FIGS. 8A-8C illustrate exemplary delay cells in the partial circuit 700 shown in FIG. 7, in accordance with some embodiments of the present disclosure. As shown in FIG. 8A, a delay cell 810 in a delay line of an EPC may include an invertor or amplifier 811 coupled to a resistor 812. The resistance of the resistor 812 is controlled by a digital bit D1(0). That is, the digital bit D1(0) is used to control the resistance of the delay cell 810 to change phase delay of the electrical signal going through the delay line in the EPC.

In the example shown in FIG. 8B, a delay cell 820 in a delay line of an EPC may include an invertor or amplifier 821 coupled to a current source 822. The current of the current source 822 is controlled by a digital bit D1(0). That is, the digital bit D1(0) is used to control the current of the delay cell 820 to change phase delay of the electrical signal going through the delay line in the EPC.

In the example shown in FIG. 8C, a delay cell 830 in a delay line of an EPC may include an invertor or amplifier 831 coupled to a capacitor 832. The capacitance of the capacitor 832 is controlled by a digital bit D1(0). That is, the digital bit D1(0) is used to control the capacitor 832 in the delay cell 820 to change phase delay of the electrical signal going through the delay line in the EPC.

According to various embodiments, each delay cell in a delay line of an EPC may follow a structure shown in any of FIGS. 8A-8C. Different delay cells may have a same structure or different structures.

Figure 9:
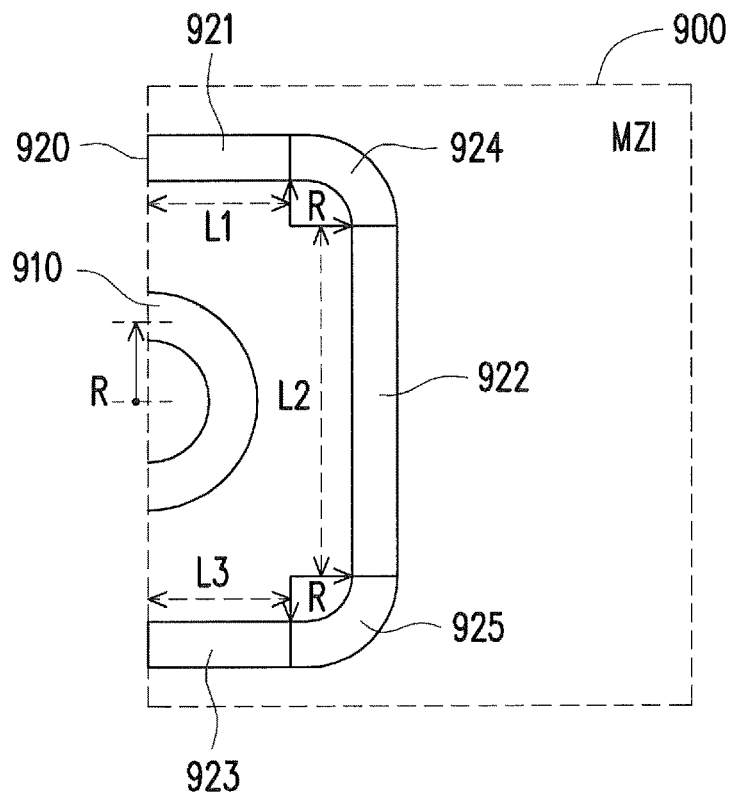
FIG. 9 illustrates an exemplary Mach-Zehnder interferometer (MZI) implemented as part of a phase shifter, in accordance with some embodiments of the present disclosure.

FIG. 9 illustrates an exemplary Mach-Zehnder interferometer (MZI) 900 implemented as part of a phase shifter, e.g. the phase shifter 130 in FIG. 1 or the phase shifter 330 in FIG. 3, in accordance with some embodiments of the present disclosure. As shown in FIG. 9, the MZI 900 includes two unbalanced waveguides: a first waveguide 910 and a second waveguide 920. The MZI 900 may be merged into a phase shifter. That is, each of the first waveguide 910 and the second waveguide 920 may be a segment of a waveguide arm of the phase shifter.

In the example shown in FIG. 9, the second waveguide 920 is designed to be longer than the first waveguide 910 by a length difference ΔL predetermined based on a phase shift requirement associated with the MZI 900. When the phase shifter has a symmetric structure as shown in FIG. 1 or FIG. 3, the length difference ΔL is equal to a total length difference between the first waveguide arm and the second waveguide arm of the phase shifter.

As shown in FIG. 9, the first waveguide 910 is a semicircle segment having a radius R; the second waveguide 920 includes: three straight portions 921, 922, 923 and two circular arcs 924, 925 connecting the three straight portions 921, 922, 923. The three straight portions 921, 922, 923 have a length of L1, L2, L3, respectively. Each of the two circular arcs 924, 925 has a 90 degree and the same radius R as that of the semicircle segment of the first waveguide 910. As such, the total length of the two circular arcs 924, 925 is equal to the total length of the semicircle segment of the first waveguide 910. Therefore, the length difference ΔL between the first waveguide 910 and the second waveguide 920 is equal to a total length of the three straight portions 921, 922, 923, i.e. ΔL=L1+L2+L3.

Figure 10:
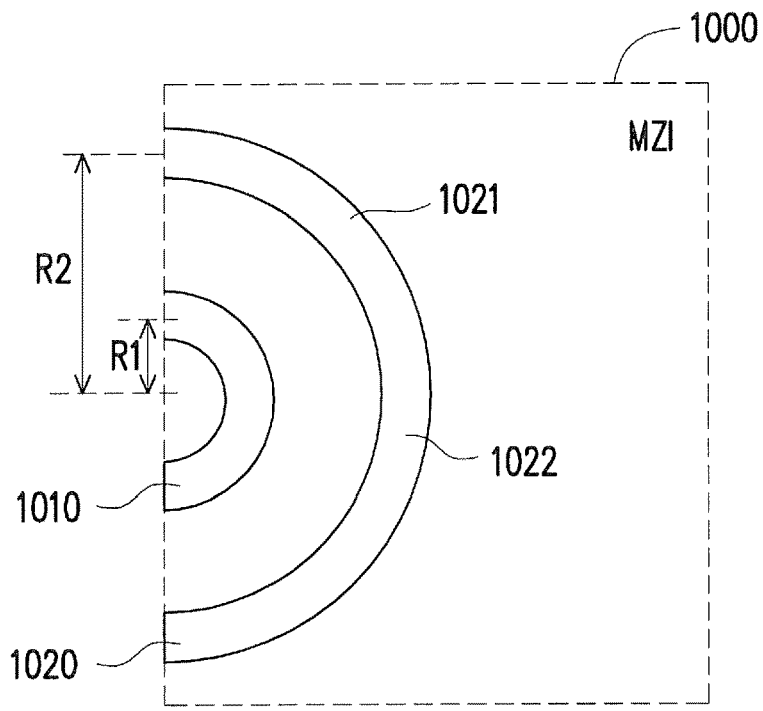
FIG. 10 illustrates another exemplary Mach-Zehnder interferometer (MZI) implemented as part of a phase shifter, in accordance with some embodiments of the present disclosure.

FIG. 10 illustrates another exemplary MZI 1000 implemented as part of a phase shifter, e.g. the phase shifter 130 in FIG. 1 or the phase shifter 330 in FIG. 3, in accordance with some embodiments of the present disclosure. The MZI 1000 includes two unbalanced waveguides: a first waveguide 1010 and a second waveguide 1020, each of which may be a segment of a waveguide arm of the phase shifter. In the example shown in FIG. 10, the second waveguide 1020 is designed to be longer than the first waveguide 1010 by a length difference ΔL predetermined based on a phase shift requirement associated with the MZI 1000. When the phase shifter has a symmetric structure as shown in FIG. 1 or FIG. 3, the length difference ΔL is equal to a total length difference between the first waveguide arm and the second waveguide arm of the phase shifter.

As shown in FIG. 10, the first waveguide 1010 is a semicircle segment having a first radius R1; the second waveguide 1020 is a semicircle segment having a second radius R2 that is larger than the first radius R1. As such, the second waveguide 1020 has a first arc 1021 with a same length as that of the first waveguide 1010, and has a second arc 1022 with a length equal to the length difference ΔL. The length difference ΔL between the first waveguide 1010 and the second waveguide 1020 is equal to the length of the second arc 1022, i.e. ΔL=π (R2−R1).

Figure 11:
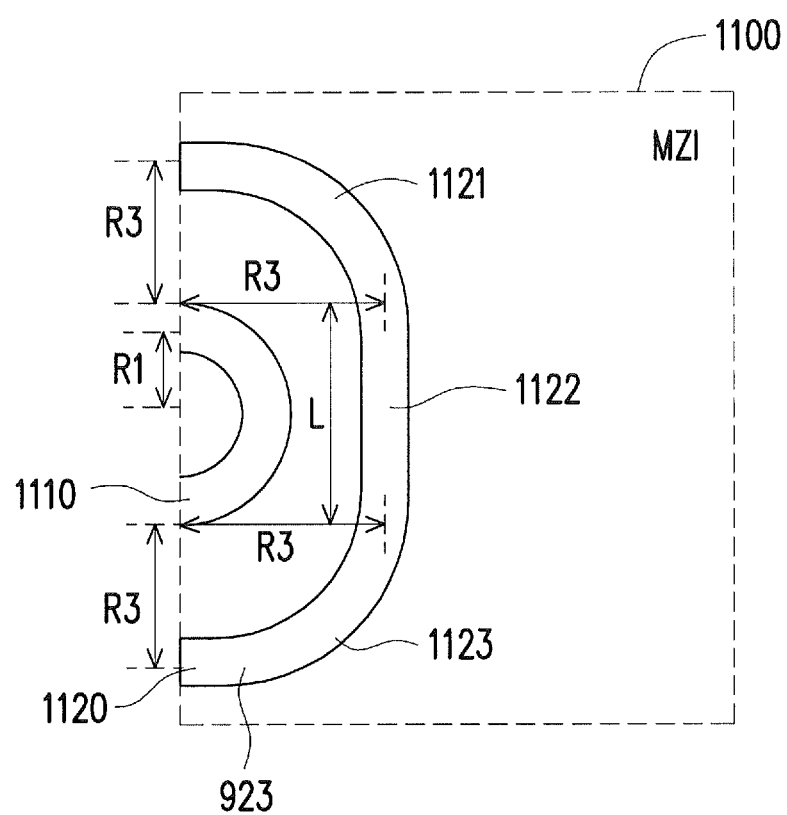
FIG. 11 illustrates yet another exemplary Mach-Zehnder interferometer (MZI) implemented as part of a phase shifter, in accordance with some embodiments of the present disclosure.

FIG. 11 illustrates yet another exemplary MZI 1100 implemented as part of a phase shifter, e.g. the phase shifter 130 in FIG. 1 or the phase shifter 330 in FIG. 3, in accordance with some embodiments of the present disclosure. The MZI 1100 includes two unbalanced waveguides: a first waveguide 1110 and a second waveguide 1120, each of which may be a segment of a waveguide arm of the phase shifter. In the example shown in FIG. 11, the second waveguide 1120 is designed to be longer than the first waveguide 1110 by a length difference ΔL predetermined based on a phase shift requirement associated with the MZI 1100. When the phase shifter has a symmetric structure as shown in FIG. 1 or FIG. 3, the length difference ΔL is equal to a total length difference between the first waveguide arm and the second waveguide arm of the phase shifter.

As shown in FIG. 11, the first waveguide 1110 is a first semicircle having a first radius R1; the second waveguide 1120 includes: two circular arcs 1121, 1123, and one straight portion 1122 connecting the two circular arcs 1121, 1123. The straight portion 1122 has a length of L. Each of the two circular arcs 1121, 1123 has a 90 degree and a third radius R3 that is larger than the first radius R1. The two circular arcs 1121, 1123 have a total length equal to a length of a second semicircle having the third radius R3. As such, the length difference ΔL between the first waveguide 1110 and the second waveguide 1120 is equal to the length of the straight portion 1122 plus the length difference between the first and second semicircles, i.e. ΔL=L+π (R3-R1). In the embodiments shown in FIGS. 9-11, the length difference ΔL is predetermined based on a phase shift requirement associated with the MZI, and has a length typically between 1 micrometer and 100 micrometers.

In some embodiments, an optical device is disclosed. The optical device includes: a splitter configured for splitting an input optical signal into a first optical signal and a second optical signal; a phase shifter coupled to the splitter; and a combiner coupled to the phase shifter. The phase shifter includes: a first waveguide arm configured for controlling a first phase of the first optical signal to generate a first phase-controlled optical signal, and a second waveguide arm configured for controlling a second phase of the second optical signal to generate a second phase-controlled optical signal. Each of the first and second waveguide arms includes: a plurality of straight segments and a plurality of curved segments. The combiner is configured for combining the first and second phase-controlled optical signals to generate an output optical signal.

In some embodiments, an optical device is disclosed. The optical device includes: a splitter configured for splitting an input optical signal into a first optical signal and a second optical signal; a plurality of phase calibrators configured for generating a plurality of sets of electrical signals, wherein each of the plurality of sets includes electrical signals with different phase delays; a phase shifter coupled to the splitter; and a combiner coupled to the phase shifter. The phase shifter includes: a first waveguide arm configured for controlling a first phase of the first optical signal, based on at least one set of the plurality of sets of electrical signals, to generate a first phase-controlled optical signal; and a second waveguide arm configured for controlling a second phase of the second optical signal, based on at least one set of the plurality, of sets of electrical signals, to generate a second phase-controlled optical signal. The combiner is configured for combining the first and second phase-controlled optical signals to generate an output optical signal.

In some embodiments, a phase shifter is disclosed. The phase shifter includes: a first waveguide arm configured for controlling a first phase of the first optical signal to generate a first phase-controlled optical signal; and a second waveguide arm configured for controlling a second phase of the second optical signal to generate a second phase-controlled optical signal. Each of the first and second waveguide arms includes: a plurality of straight segments and a plurality of curved segments. The phase shifter comprises an interferometer comprising: a first curved segment in the plurality of curved segments of the first waveguide arm, and a second curved segment in the plurality of curved segments of the second waveguide arm.

In some embodiments, a method is disclosed. The method includes: splitting an input optical signal into a first optical signal and a second optical signal; generating a plurality of sets of electrical signals, wherein each of the plurality of sets includes electrical signals with different phase delays; controlling a first phase of the first optical signal, based on at least one set of the plurality of sets of electrical signals, to generate a first phase-controlled optical signal; controlling a second phase of the second optical signal, based on at least one set of the plurality of sets of electrical signals, to generate a second phase-controlled optical signal; and combining the first and second phase-controlled optical signals to generate an output optical signal While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations are used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, signal, etc. that is physically constructed, programmed, arranged and/or formatted to perform the specified operation or function.

Furthermore, a person of ordinary skill in the art would understand that various illustrative logical blocks, modules, devices, components and circuits described herein can be implemented within or performed by an integrated circuit (IC) that can include a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A processor programmed to perform the functions herein will become a specially programmed, or special-purpose processor, and can be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. An optical device, comprising:
a splitter configured for splitting an input optical signal into a first optical signal and a second optical signal; and
a phase shifter coupled to the splitter, wherein the phase shifter comprises:
a first waveguide arm configured for controlling a first phase of the first optical signal to generate a first phase-controlled optical signal, and
a second waveguide arm configured for controlling a second phase of the second optical signal to generate a second phase-controlled optical signal, wherein each of the first and second waveguide arms comprises: a plurality of straight segments and a plurality of curved segments, wherein:
the phase shifter comprises an interferometer comprising: a first curved segment in the plurality of curved segments of the first waveguide arm, and a second curved segment in the plurality of curved segments of the second waveguide arm, the first curved segment is a semicircle segment, and
the second curved segment comprises: two circular arcs each having a 90 degree, and one straight portion connecting the two circular arcs.

2. The optical device of claim 1, wherein, for each of the first and second waveguide arms:
the plurality of straight segments are parallel to each other; and
the plurality of straight segments have a same length.

3. The optical device of claim 1, wherein, for each of the first and second waveguide arms:
any adjacent two straight segments among the plurality of straight segments are connected via one of the plurality of curved segments.

4. The optical device of claim 1, wherein, for each of the first and second waveguide arms:
the plurality of straight segments and the plurality of curved segments are alternatively arranged.

5. The optical device of claim 1, wherein each of the first and second waveguide arms includes an even number of straight segments and an odd number of curved segments.

6. The optical device of claim 1, wherein the second curved segment is longer than the first curved segment by a length difference predetermined based on a phase shift requirement associated with the interferometer.

7. The optical device of claim 1, further comprising:
a combiner coupled to the phase shifter and configured for combining the first and second phase-controlled optical signals to generate an output optical signal.

8. An optical device, comprising:
a splitter configured for splitting an input optical signal into a first optical signal and a second optical signal;
a plurality of phase calibrators configured for generating a plurality of sets of electrical signals, wherein each of the plurality of sets includes electrical signals with different phase delays; and
a phase shifter coupled to the splitter, wherein the phase shifter comprises:
a first waveguide arm configured for controlling a first phase of the first optical signal, based on at least one set of the plurality of sets of electrical signals, to generate a first phase-controlled optical signal, and
a second waveguide arm configured for controlling a second phase of the second optical signal, based on at least one set of the plurality of sets of electrical signals, to generate a second phase-controlled optical signal, wherein:
at least one of the plurality of phase calibrators comprises an array of delay cells, and utilizes N digital bit signals to control phase delays of electrical signals generated by the phase calibrator by controlling a resistance of at least one of the delay cells, wherein N is a predetermined integer.

9. The optical device of claim 8, wherein each of the first and second waveguide arms comprises: a plurality of straight segments and a plurality of curved segments.

10. The optical device of claim 9, wherein, for each of the first and second waveguide arms:
each of the plurality of straight segments corresponds to one of the plurality of phase calibrators; and
a quantity of the plurality of straight segments is equal to a quantity of the plurality of phase calibrators.

11. The optical device of claim 9, wherein:
at least one of the plurality of phase calibrators comprises an array of delay cells, and utilizes the N digital bit signals to control the phase delays by controlling a resistance of at least one of the delay cells.

12. The optical device of claim 9, wherein:
at least one of the plurality of phase calibrators comprises an array of switched capacitors; and
the N digital bit signals control the phase delays by controlling the array of switched capacitors.

13. The optical device of claim 9, wherein:
at least one of the plurality of phase calibrators comprises an array of delay cells, and utilizes the N digital bit signals to control the phase delays by controlling a capacitance of at least one of the delay cells.

14. A method, comprising:
splitting an input optical signal into a first optical signal and a second optical signal;
generating a plurality of sets of electrical signals, wherein each of the plurality of sets includes electrical signals with different phase delays;
utilizing a plurality of digital bit signals to control phase delays of the electrical signals by controlling a current of at least one of an array of delay cells;
controlling a first phase of the first optical signal, based on at least one set of the plurality of sets of electrical signals, to generate a first phase-controlled optical signal;
controlling a second phase of the second optical signal, based on at least one set of the plurality of sets of electrical signals, to generate a second phase-controlled optical signal; and
combining the first and second phase-controlled optical signals to generate an output optical signal.

15. The method of claim 14, wherein:
the first phase of the first optical signal is controlled based on a first set and a second set of the plurality of sets of electrical signals; and
the second phase of the second optical signal is controlled based on a third set and a fourth set of the plurality of sets of electrical signals.

16. A phase shifter, comprising:
a first waveguide arm configured for controlling a first phase of the first optical signal to generate a first phase-controlled optical signal; and
a second waveguide arm configured for controlling a second phase of the second optical signal to generate a second phase-controlled optical signal, wherein:
each of the first and second waveguide arms comprises a plurality of curved segments,
the phase shifter comprises an interferometer comprising: a first curved segment in the plurality of curved segments of the first waveguide arm, and a second curved segment in the plurality of curved segments of the second waveguide arm,
the second curved segment is longer than the first curved segment by a length difference that is equal to a total length difference between the first waveguide arm and the second waveguide arm.

17. The phase shifter of claim 16, wherein:
the length difference is predetermined based on a phase shift requirement associated with the interferometer.

18. The phase shifter of claim 16, wherein:
the first curved segment is a semicircle segment having a first radius;
the second curved segment includes: three straight portions and two circular arcs connecting the three straight portions; and
each of the two circular arcs has a 90 degree and the first radius.

19. The phase shifter of claim 16, wherein:
the first curved segment is a semicircle segment having a first radius; and
the second curved segment is a semicircle segment having a second radius that is larger than the first radius.

20. The phase shifter of claim 16, wherein:
the first curved segment is a semicircle segment having a first radius; and
the second curved segment includes: two circular arcs each having a 90 degree and a third radius that is larger than the first radius, and one straight portion connecting the two circular arcs.

\* \* \* \* \*